(12) United States Patent
Hsiao

(10) Patent No.: US 7,174,983 B1
(45) Date of Patent: Feb. 13, 2007

(54) MOTOR-DRIVEN VEHICLE

(75) Inventor: Chen-Chi Hsiao, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 0 days.

(21) Appl. No.: 11/203,034

(22) Filed: Aug. 12, 2005

(51) Int. Cl.
*B62D 61/00* (2006.01)
*B62D 61/06* (2006.01)

(52) U.S. Cl. ............... 180/208; 180/214; 180/65.5

(58) Field of Classification Search ............... 108/208, 108/216, 219, 214, 68.5, 65.5; 429/177, 429/100, 63, 120; 414/343, 345, 401; 296/65.05; 320/104
See application file for complete search history.

(56) References Cited

U.S. PATENT DOCUMENTS

| | | | |
|---|---|---|---|
| 4,696,508 A * | 9/1987 | Brautigam | 180/68.5 |
| 5,036,938 A * | 8/1991 | Blount et al. | 180/208 |
| 5,360,307 A * | 11/1994 | Schemm et al. | 180/68.5 |
| 5,681,668 A * | 10/1997 | Reed et al. | 429/100 |
| 6,230,834 B1 * | 5/2001 | Van Hout et al. | 180/68.5 |
| 6,378,642 B1 * | 4/2002 | Sutton | 180/208 |
| 6,622,744 B2 * | 9/2003 | Crook et al. | 429/63 |
| 6,624,610 B1 * | 9/2003 | Ono et al. | 320/104 |
| 6,699,616 B2 * | 3/2004 | Wu | 180/208 |
| 6,718,996 B2 * | 4/2004 | Crook et al. | 429/63 |

FOREIGN PATENT DOCUMENTS

JP         10286283 A  * 10/1998

* cited by examiner

*Primary Examiner*—Hau Phan
(74) *Attorney, Agent, or Firm*—McNees Wallace & Nurick LLC

(57) ABSTRACT

A motor-driven vehicle includes: a chassis; a post extending upwardly from the chassis and having an upright engaging wall formed with an engaging hole; a battery housing seated on the chassis adjacent to the post and including a mounting wall disposed adjacent to the engaging wall; a coupling device including an engaging rod having a pivot portion pivoted to the mounting wall of the battery housing, and an engaging portion extending from the pivot portion, the engaging rod being pivotable relative to the battery housing between an engaging position, where the engaging portion extends into the engaging hole, and a disengaging position, where the engaging portion is disengaged from the engaging hole; and a biasing member for urging the engaging rod to the engaging position.

6 Claims, 5 Drawing Sheets

MOTOR-DRIVEN VEHICLE

BACKGROUND OF THE INVENTION

1. Field of the Invention

The invention relates to a motor-driven vehicle, more particularly to a motor-driven vehicle with a coupling device for coupling a battery housing to a post on a chassis.

2. Description of the Related Art

A motor-driven vehicle adapted for handicapped passengers is provided with electromotive equipment on a chassis thereof. In general, the electromotive equipment includes a battery housing for accommodating a battery set therein. The battery housing is usually mounted detachably on a rear end of the chassis.

As shown in FIG. 1, a conventional motor-driven vehicle 2 includes a chassis 21 and a battery housing 22 mounted on the chassis 21 through a coupling device 1. The chassis 21 has an upper side 211 with a battery housing mounting region 212 for mounting of the battery housing 22 thereon.

The coupling device 1 includes a first tape 11 fixedly mounted on the battery housing mounting region 212, and a second tape 12 fixedly mounted on a bottom side of the battery housing 22. The first and second tapes 11, 12 engage detachably with each other in a hook-and-loop engaging manner so as to secure the battery housing 22 on the chassis 21.

However, detachment of the second tape 12 from the first tape 11 requires peeling of the second tape 12 from the first tape 11 and simultaneous lifting of the battery housing 22 against the resistance provided by the hook-and-loop engagement between the first and second tapes 11, 12, which is relatively inconvenient and laborious for the handicapped passengers.

SUMMARY OF THE INVENTION

Therefore, the main object of the present invention is to provide a motor-driven vehicle that can overcome the aforesaid drawbacks associated with the prior art.

Accordingly, there is provided a motor-driven vehicle that comprises: a chassis having an upper side; a post extending upwardly and transversely from the upper side, and having an upright engaging wall formed with an engaging hole; a battery housing seated on the upper side of the chassis adjacent to the post, and including a mounting wall disposed adjacent to the engaging wall of the post; a coupling device including an engaging rod having a pivot portion pivoted to the mounting wall of the battery housing, and an engaging portion extending from the pivot portion, the engaging rod being pivotable relative to the battery housing between an engaging position, where the engaging portion extends into the engaging hole so as to couple the battery housing to the post, and a disengaging position, where the engaging portion is disengaged from the engaging hole so as to permit detachment of the battery housing from the post; and a biasing member for urging the engaging rod to the engaging position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
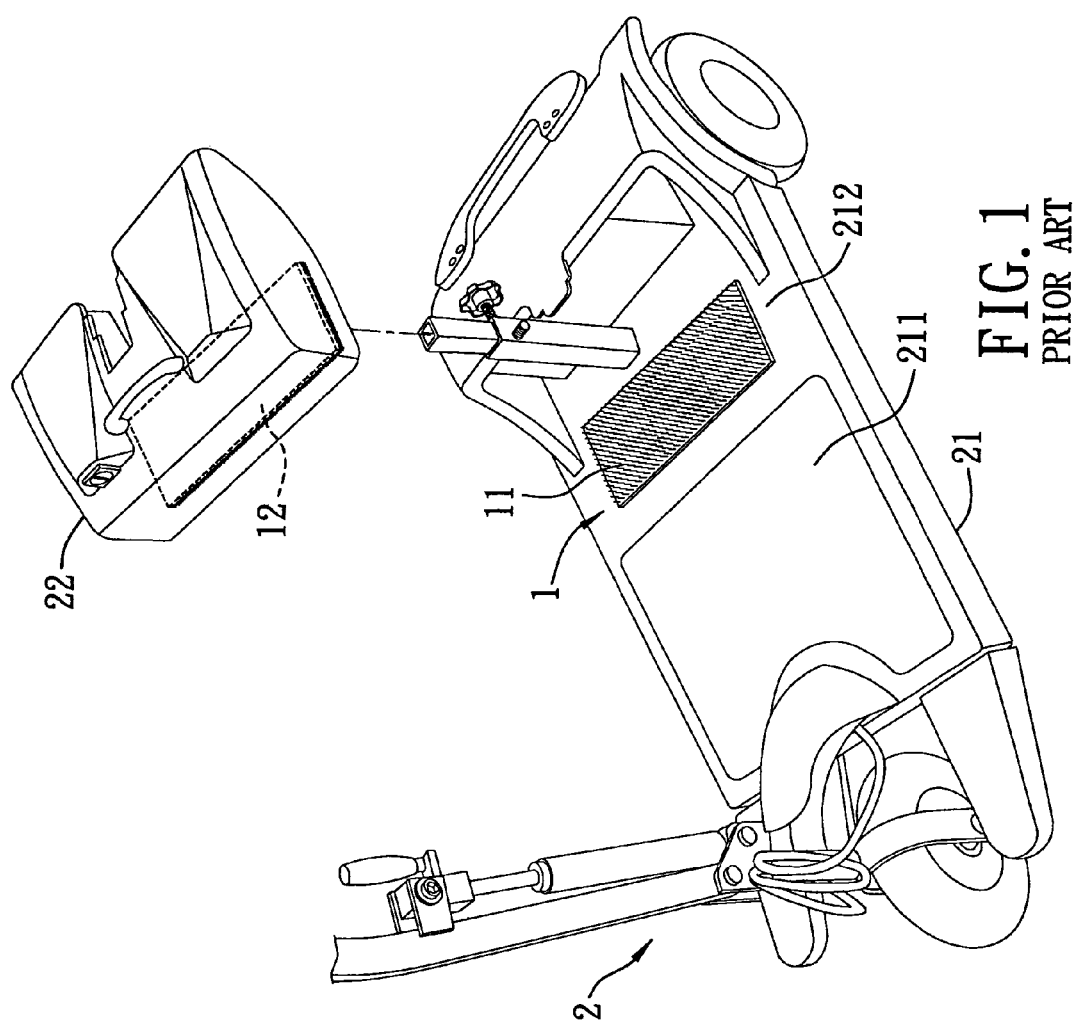
FIG. 1 is a fragmentary, partly exploded perspective view of a conventional motor-driven vehicle.
Figure 2:
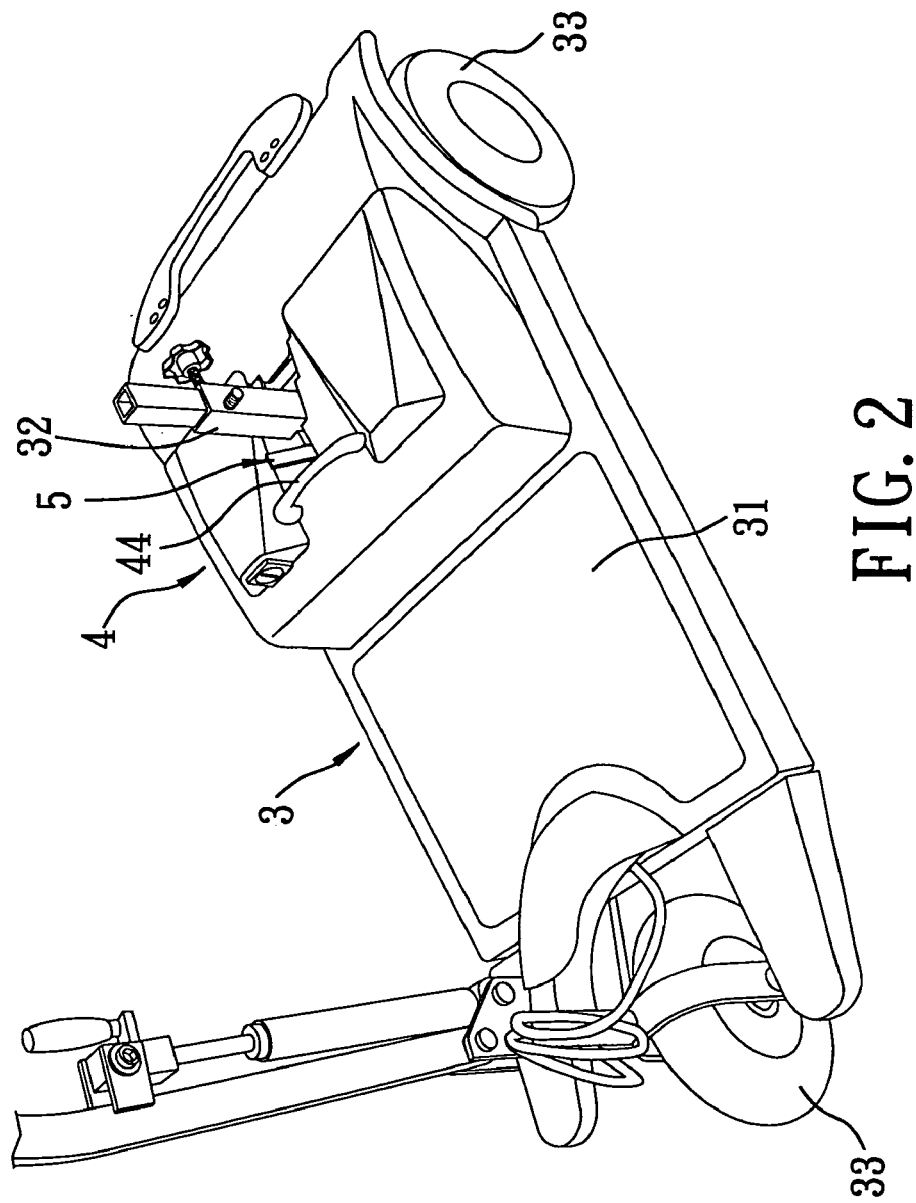
FIG. 2 is a fragmentary perspective view of the preferred embodiment of a motor-driven vehicle according to the present invention.
Figure 3:
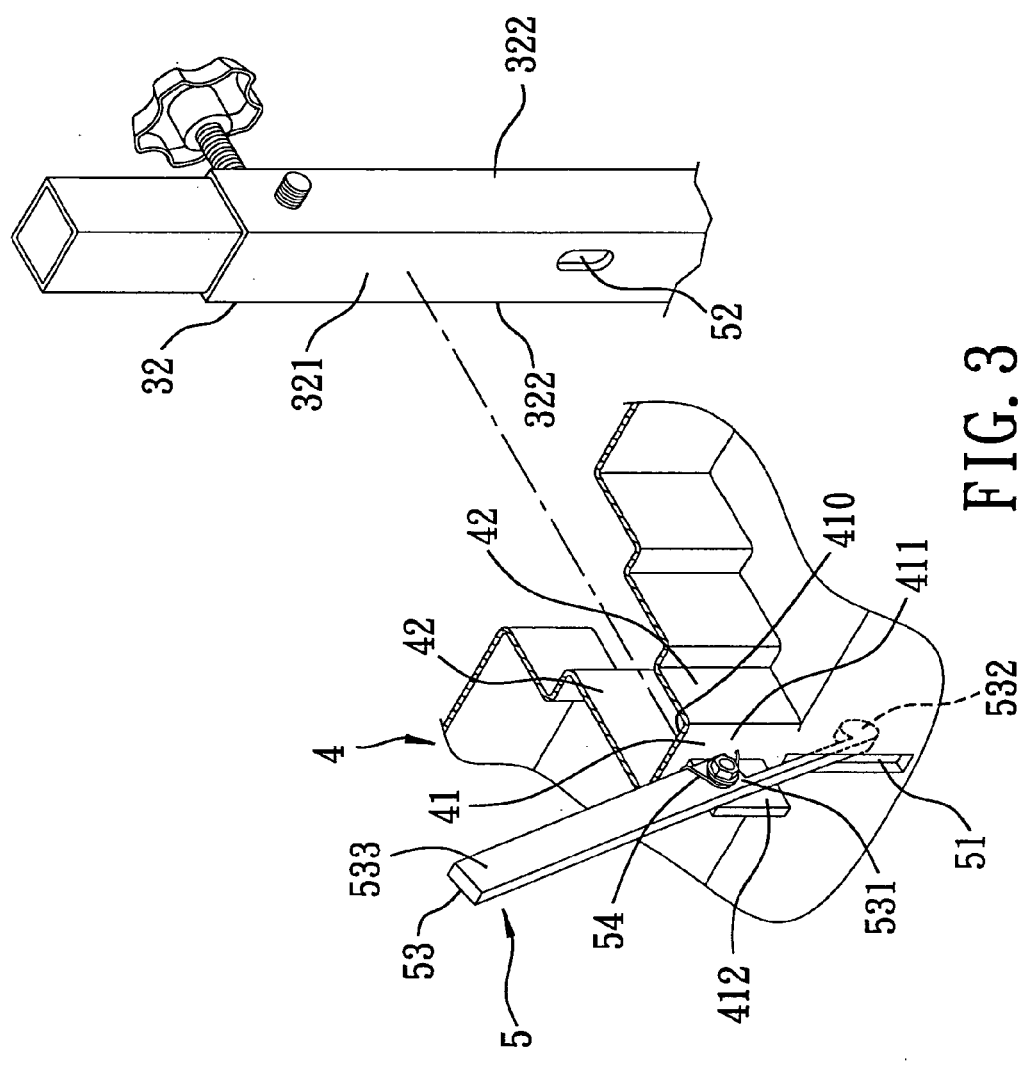
FIG. 3 is a fragmentary, partly exploded perspective view to illustrate how a battery housing is coupled to a post through a coupling device of the preferred embodiment.
Figure 4:
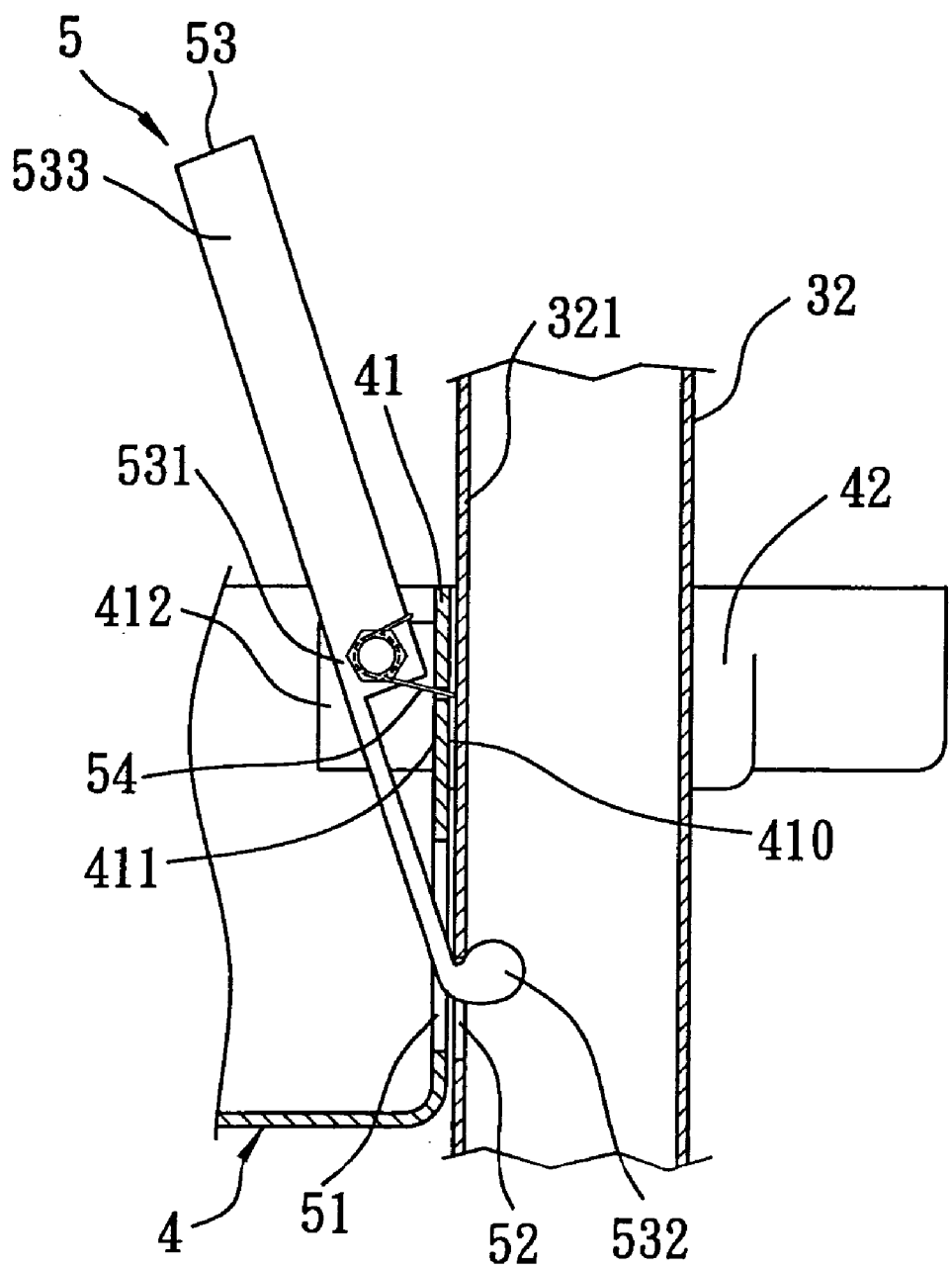
FIG. 4 is a fragmentary, partly sectional view to illustrate a state where an engaging rod is disposed at an engaging position.

Referring to FIGS. 2, 3 and 4, the preferred embodiment of a motor-driven vehicle according to the present invention is shown to include: a chassis 3 having an upper side 31; a post 32 extending upwardly and transversely from the upper side 31, and having an upright engaging wall 321 formed with an engaging hole 52; a battery housing 4 seated on the upper side 31 of the chassis 3 adjacent to the post 32, and including a mounting wall 41 disposed adjacent to the engaging wall 321 of the post 32; a coupling device 5 including an engaging rod 53 having a pivot portion 531 pivoted to the mounting wall 41 of the battery housing 4, and an engaging portion 532 extending from the pivot portion 531, the engaging rod 53 being pivotable relative to the battery housing 4 between an engaging position (see FIG. 4), where the engaging portion 532 extends into the engaging hole 52 so as to couple the battery housing 4 to the post 32, and a disengaging position (see FIG. 5), where the engaging portion 532 is disengaged from the engaging hole 52 so as to permit detachment of the battery housing 4 from the post 32; and a biasing member 54 for urging the engaging rod 53 to the engaging position.

In the preferred embodiment, the mounting wall 41 of the battery housing 4 is formed with a through-hole 51 registered with the engaging hole 52, and has a rear side 410 adjacent to the engaging wall 321, and a front side 411 opposite to the rear side 410. The pivot portion 531 of the engaging rod 53 is pivoted to the front side 411 of the mounting wall 41 such that the engaging portion 532 extends through the through-hole 51 and into the engaging hole 52 when the engaging rod 53 is disposed at the engaging position.

The engaging rod 53 further includes an operating portion 533 extending from the pivot portion 531 and disposed opposite to the engaging portion 532 for manual operation to move the engaging rod 53 to the disengaging position.

In this embodiment, the front side 411 of the mounting wall 41 is formed with a lug plate 412 projecting therefrom. The pivot portion 531 of the engaging rod 53 is pivoted to the lug plate 412. The biasing member 54 includes a torsion spring that is mounted on the pivot portion 531 of the engaging rod 53 and that abuts against the mounting wall 41.

As best shown in FIG. 3, the engaging wall 321 has two opposite sides. The post 32 further includes a pair of lateral walls 322 extending respectively and transversely from the sides of the engaging wall 321. The mounting wall 41 has two opposite lateral sides. The battery housing 4 further includes a pair of lateral walls 42 extending respectively and transversely from the lateral sides of the mounting wall 41 for embracing the lateral walls 322 of the post 32 when the battery housing 4 is coupled to the post 32.

A handgrip 44 is provided on the battery housing 4. A plurality of wheels 33 are connected to the chassis 3.

When mounting the battery housing 4 on the chassis 3, first, the mounting wall 41 is aligned with the engaging wall 321 such that the lateral walls 42 of the battery housing 4 embrace the lateral walls 322 of the post 3 and such that the mounting wall 41 abuts against the engaging wall 321. The engaging portion 532 of the engaging rod 53 slides on the engaging wall 321, and extends through the through-hole 51 in the mounting wall 41 and into the engaging hole 52 in the engaging wall 321 when the through-hole 51 in the mounting wall 41 is registered with the engaging hole 52 in the engaging wall 321.

Figure 5:
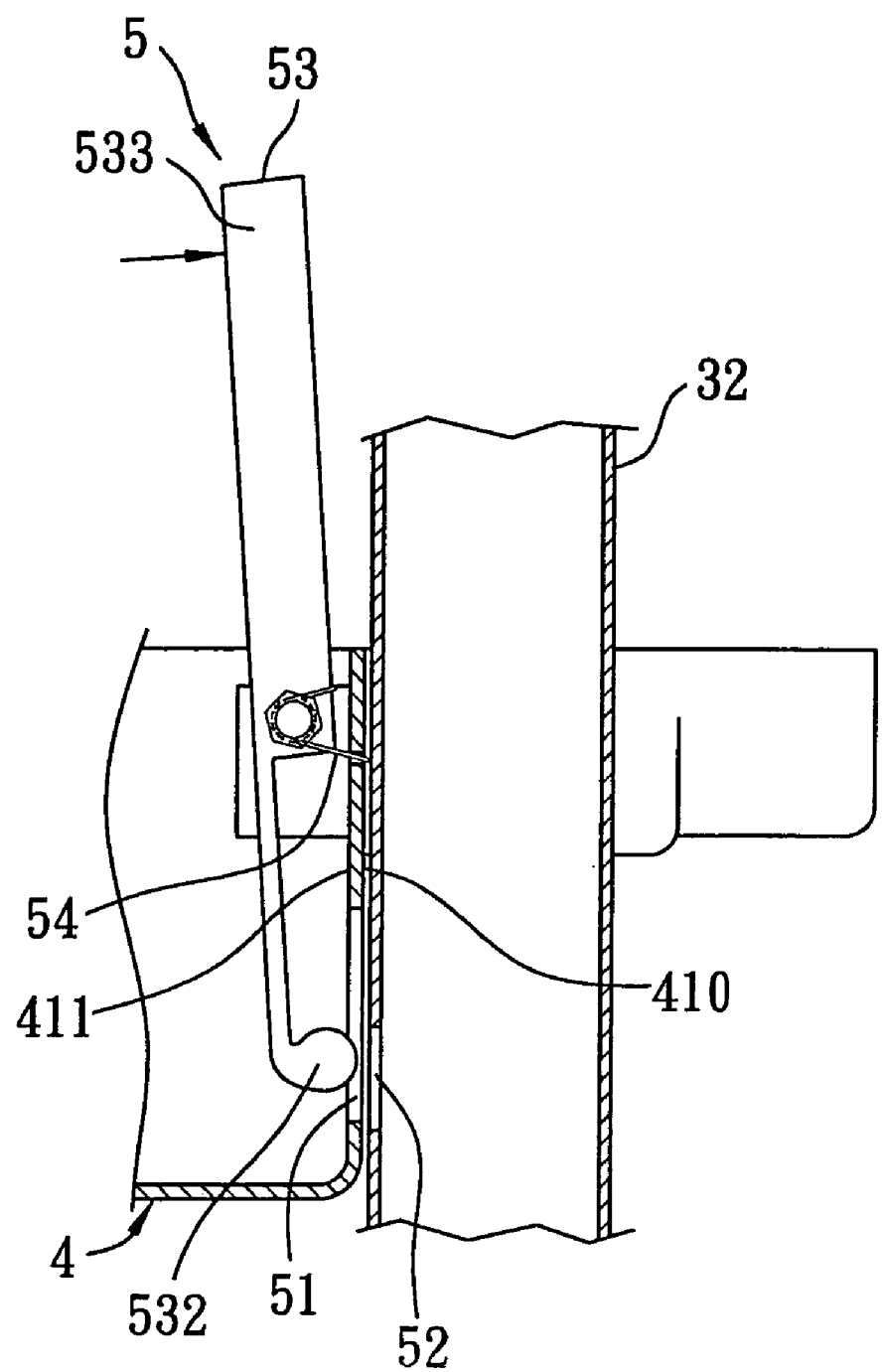
FIG. 5 is a fragmentary, partly sectional view to illustrate another state where the engaging rod is disposed at a disengaging position.

On the other hand, to detach the battery housing 4 from the chassis 3, as shown in FIG. 5, the operating portion 533 is operated to move the engaging portion 532 of the engaging rod 53 away from the through-hole 51 and the engaging hole 52.

With the inclusion of the coupling device 5 in the motor-driven vehicle of this invention, the aforesaid drawback associated with the prior art can be alleviated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A motor-driven vehicle comprising:
    a chassis having an upper side;
    a post extending upwardly and transversely from said upper side of said chassis, said post having an upright engaging wall formed with an engaging hole;
    a battery housing seated on said upper side of said chassis adjacent to said post, said battery housing including a mounting wall disposed adjacent to said engaging wall of said post;
    a coupling device including an engaging rod having a pivot portion pivoted to said mounting wall of said battery housing, said engaging rod further having an engaging portion extending from said pivot portion, said engaging rod being pivotable relative to said battery housing between an engaging position, where said engaging portion extends into said engaging hole so as to couple said battery housing to said post, and a disengaging position, where said engaging portion is disengaged from said engaging hole so as to permit detachment of said battery housing from said post; and
    a biasing member for urging said engaging rod to the engaging position.

2. The motor-driven vehicle as claimed in claim 1, wherein said mounting wall of said battery housing is formed with a through-hole registered with said engaging hole, and has a rear side adjacent to said engaging wall, and a front side opposite to said rear side, said pivot portion of said engaging rod being pivoted to said front side of said mounting wall such that said engaging portion extends through said through-hole and into said engaging hole when said engaging rod is disposed at the engaging position.

3. The motor-driven vehicle as claimed in claim 2, wherein said engaging rod further includes an operating portion extending from said pivot portion and disposed opposite to said engaging portion for manual operation to move said engaging rod to the disengaging position.

4. The motor-driven vehicle as claimed in claim 2, wherein said front side of said mounting wall is formed with a lug plate projecting therefrom, said pivot portion of said engaging rod being pivoted to said lug plate.

5. The motor-driven vehicle as claimed in claim 4, wherein said biasing member includes a torsion spring mounted on said pivot portion of said engaging rod and abutting against said mounting wall.

6. The motor-driven vehicle as claimed in claim 5, wherein said engaging wall has two opposite sides, said post further including a pair of lateral walls extending respectively and transversely from said sides of said engaging wall, said mounting wall having two opposite lateral sides, said battery housing further including a pair of lateral walls extending respectively and transversely from said lateral sides of said mounting wall for embracing said lateral walls of said post when said battery housing is coupled to said post.

* * * * *